April 20, 1926.
A. H. STEBBINS
1,581,242
CLASSIFIER
Filed May 6, 1925     3 Sheets-Sheet 1
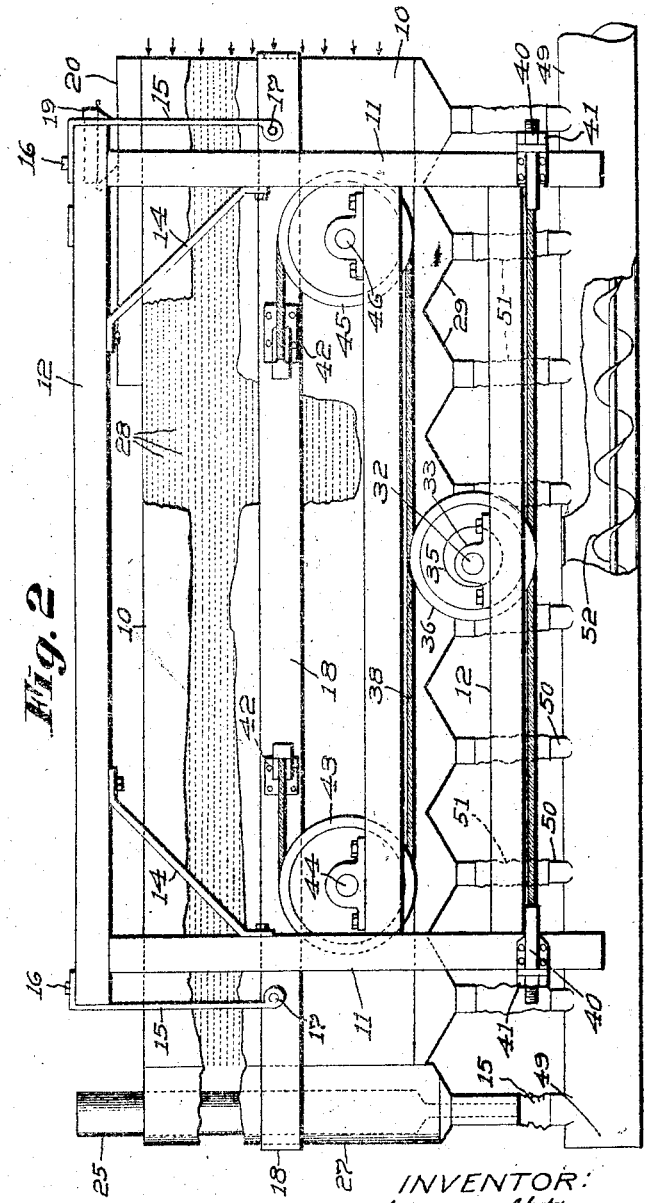
INVENTOR:
Albert H. Stebbins
BY Robt R. Harris
ATTORNEY

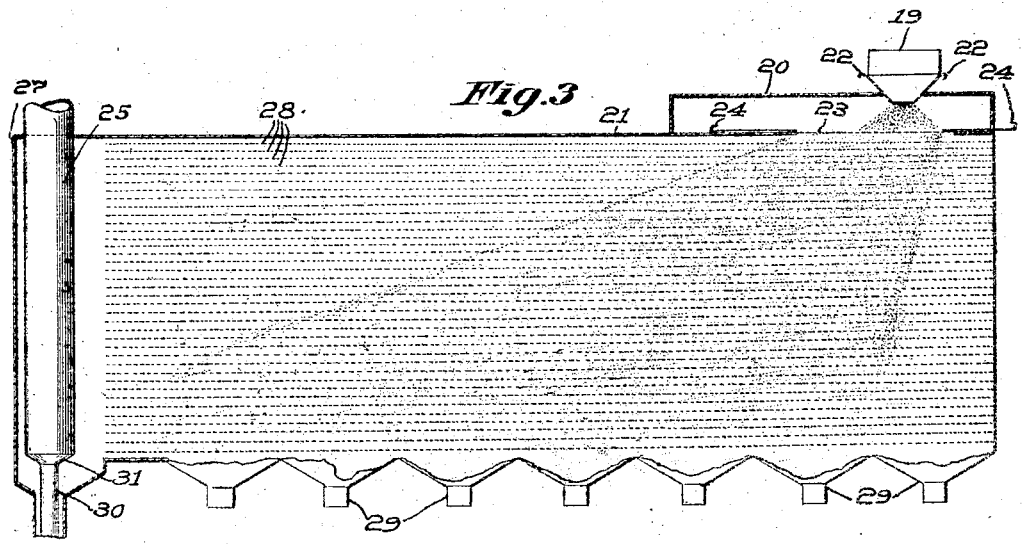
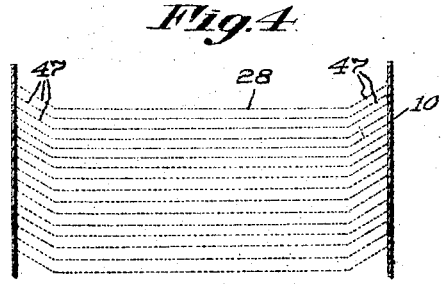
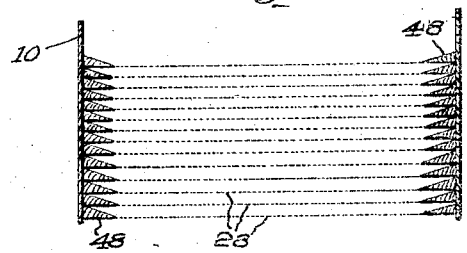

April 20, 1926.
A. H. STEBBINS
1,581,242
CLASSIFIER
Filed May 6, 1925   3 Sheets-Sheet 3
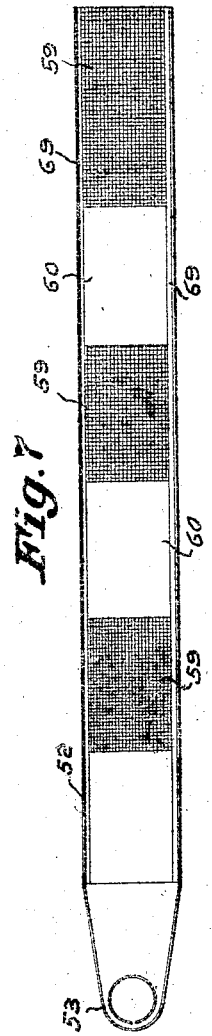
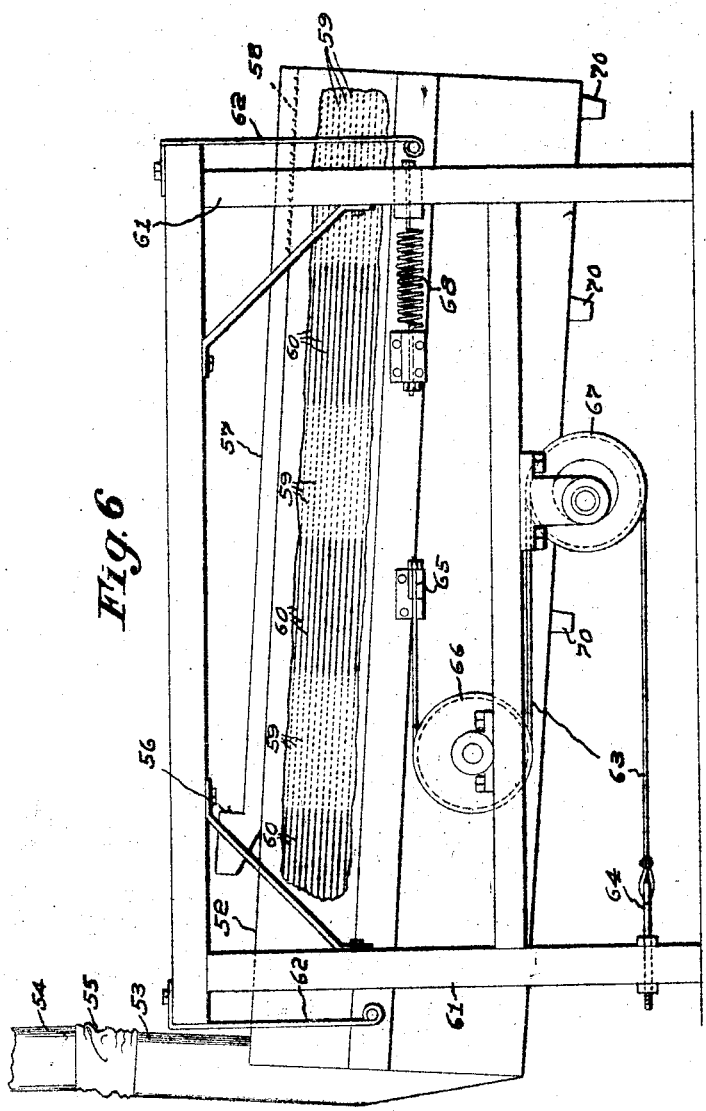
INVENTOR:
Albert H. Stebbins
BY Robt. T. Hains
ATTORNEY Patented Apr. 20, 1926.

1,581,242

UNITED STATES PATENT OFFICE.

ALBERT H. STEBBINS, OF LOS ANGELES, CALIFORNIA.

CLASSIFIER.

Application filed May 6, 1925. Serial No. 28,371.

*To all whom it may concern:*

Be it known that I, ALBERT H. STEBBINS, a citizen of the United States, and resident of Los Angeles, in the county of Los Angeles and State of California, have invented an Improvement in Classifiers, of which the following description, in connection with the accompanying drawings, is a specification, like characters on the drawings representing like parts.

This invention relates to classifiers that are constructed to treat fine materials by subjecting them repeatedly to the separating action of air currents.

In the separation of ores and other materials it is often desirable to treat fine dust like material to remove therefrom the very fine powder-like dust, and, in order to effect a complete separation of these fine materials they must be subjected repeatedly to a gentle separating force which will remove the very fine dust without carrying off the slightly coarser dust. The separation of these fine materials cannot be effected by a single treatment because if a force is employed that is strong enough to remove all of the very fine particles, it will also remove more or less of the slightly coarser particles.

One important feature of the present invention, therefore, resides in a classifier which is so constructed that as the materials to be treated pass downwardly thru a casing, they are subjected time and time again to the gentle separating action of air currents that pass thru the falling materials.

Another feature of the invention resides in a multiplicity of screens that serve to retard the downward movement of the materials being treated, and to provide a number of different air passages between the screens for the passage of air thru the falling materials.

Another feature of the invention resides in the use of a series of screens all having a mesh that is coarse enough to permit all materials being treated to pass freely therethru. In this manner clogging of the screens is prevented as the screens do not sift the materials to grade them, but serve merely to retard and spread out the materials so that they will be thoroughly exposed to the action of the air currents traveling between the screens.

In some constructions it may be desirable to form the series of screens so that each screen surface is provided with apertured sections separated by unapertured sections. Such a construction will promote stratification of the materials lying upon the unapertured sections. Another feature of the invention therefore resides in a casing having a series of screens mounted thereon, one above the other, and each screen having apertured portions separated by unapertured portions so that the materials that settle upon the unapertured sections will tend to stratify under the vibratory movement imparted to the casing and upon reaching an apertured portion will pass downwardly to the next screen.

Other features of the invention and novel combination of parts in addition to the above will be hereinafter described in connection with the accompanying drawings which illustrate good practical forms of the invention.

In the drawings:—

Fig. 1 is a top plan view of a classifier constructed in accordance with the present invention.

Fig. 2 is a side elevation of the machine shown in Fig. 1, a portion of the casing being broken away to disclose the interior thereof.

Fig. 3 is a longitudinal vertical sectional view thru the casing, removed from its supporting frame.

Fig. 4 on an enlarged scale is a vertical sectional view thru a portion of the casing.

Fig. 5 is a view similar to Fig. 4, but shows a modified construction.

Fig. 6 is a side elevation of a modified form of classifier, and;

Fig. 7 is a top plan view of one of the screens within the classifier of Fig. 6.

The casing 10 in which the materials are treated may be variously constructed, but is shown as a relatively long, narrow casing, as it is found that the air currents passing longitudinally thru the casing can be best controlled in a comparatively narrow casing. This casing may be made of sheet metal, or other materials, and is preferably supported for vibratory movement.

In the construction shown in Figs. 1 to 3 inclusive the casing 10 is supported for movement back and forth in the direction of its length by a frame consisting of uprights 11 having longitudinally extending beams 12 secured to the upper ends and lower portions of the uprights 11, and the beams 12 are secured in spaced relation to each other by transversely extending bars 13.

Inclined braces 14 bolted to the uprights 11 and beams 12 serve to strengthen the frame, and the construction is such that the casing 10 may be suspended within the frame between its spaced side walls. Various means may be provided for supporting the casing for vibratory movement relatively to its supporting frame and in the present case the casing is shown as supported by the straps 15, the upper ends of which are rigidly secured at 16 to the transversely extending rails 13, and the lower ends of these straps are secured by pins 17 to bars 18 extending longitudinally of the casing 10 and rigidly secured to the opposite walls thereof. In this manner the casing 10 is suspended by the flexible straps 15 for movement back and forth within the supporting frame and between the spaced sides of the frame.

Means is provided for delivering the materials to be treated to the upper portion of the casing and preferably near one end thereof, and in the present case the construction for supplying the materials to the casing consists of a hopper 19 which may be mounted upon a raised box-like portion 20 formed upon the top 21 of the casing 10, and the flow of the materials from the hopper 19 to the box 20 may be regulated as desired by adjusting the sliding gates 22. The materials pass from the box 20 into the casing 10 thru an opening in the upper wall 21 of the casing, which opening preferably is covered by a screen 23 of fine mesh, and the rate at which the materials pass from the box 20 into the casing 10 may be controlled by adjusting the sliding gates 24.

As stated, the separation of the materials is effected by the passage of air thru the materials, and in the construction shown the air currents are produced by providing an opening at the right hand end of the casing 10 thru which air may enter. This opening may be given any size found desirable to control the supply of air, and, if desired, the entire right-hand end of the casing 10 may be omitted so that air may enter freely thru this end of the casing thruout the entire height of the casing. A suction pipe 25 extending downwardly within the casing 10 thru the upper wall 21 serves to exhaust air from the casing to draw air in thru the opening at the right hand end of the casing and longitudinally thru the casing. This suction pipe may extend upwardly to the suction side of a fan or other means for exhausting air from the casing 10, and the air drawn into the pipe 25 preferably enters the same thru a slot 26 which faces away from the body portion of the casing 10 so that the air must pass around this pipe to the rear side thereof, as indicated by the arrows, before it enters the slot 26. This arrangement is desirable as it will prevent the air from rushing directly into the exhaust pipe 25 from the body portion of the casing 10, and will give the heavier particles an opportunity to settle within the rounded end portion 27 of the casing 10.

As stated, the present invention is directed more particularly to a classifier constructed to treat very fine materials, and the separation of these fine materials is accomplished by subjecting the materials time and time again to the separating action of gentle currents of air. If the materials upon passing thru the fine mesh screen 23 at the upper part of the casing should be permitted to fall uninterruptedly thru the casing, they obviously would pass thru the same very rapidly, and the air currents passing longitudinally thru the casing would not have an opportunity to completely separate the very fine dust like particles from the slightly coarser particles.

In order to effect the desired separation, it is desirable to retard the progress of the materials downwardly within the casing 10, and to provide a number of separate air passages where currents of air will repeatedly act upon the materials being treated. This is accomplished in accordance with the present invention by providing a large number of screens 28 that extent longitudinally within the casing 10, one above the other. These screens preferably lie in substantially a horizontal plane and all have a mesh that is large enough to permit the materials that enter the casing thru the fine mesh screen 23 to pass readily thru the larger mesh of the screens 28. It is important to note that the screens 28 do not serve to sift or grade the materials being treated, but are provided to retard the downward movement of the materials thru the casing 10 and to spread the materials out, and also to provide air passages extending longitudinally of the casing between the screens. Since the mesh of the screens 28 is relatively large, the materials will pass freely therethru without clogging, so that no difficulty due to clogging will be experienced in operating the present machine. The screens 28 may be placed very close to each other, say a half or a quarter of an inch apart, to form narrow air passages between them. As a result, as many as fifty or one hundred screens 28 may be contained in the casing 10, and as the materials pass downwardly thru the screen they will be subjected many times to the gentle action of the air passing longitudinally of the casing between the screens, and the strength of the air should be such that it will carry off the very light particles, but will not carry off the slightly heavier particles.

As the materials pass downwardly thru the casing 10, they will be gradually carried lengthwise of the screens, as indicated by the darkened portion of Fig. 3, shown as extending in an inclined direction downwardly from the opening in the box 20 towards the left-hand end of the casing and as flaring outwardly somewhat like a fan. The heavier materials will, of course, move downwardly in substantially a vertical direction, while the slightly lighter materials will be gradually carried lengthwise of the screens as they move downwardly within the casing, and as these materials reach the bottom of the casing 10 they may be drawn off thru the discharge hoppers 29, so that different grades of materials will be obtained from the different discharge hoppers.

The very fine materials which remain suspended in the air will pass upwardly thru the suction pipe 25 to the suction means not shown. Some of these lighter particles, however, may settle within the pipe 25 and this pipe is therefore shown as having a reduced tube 30 at its lower end thru which these particles may escape, and this tube is connected to the suction pipe 25 by the cone-shaped portion 31.

In order to promote the passage of the materials thru the various screens 28, it is desirable to impart a simple reciprocatory movement to the casing 10. Various means for imparting such a movement to this casing may be provided, and one satisfactory form of operating means is shown in Figs. 1 and 2 as consisting of an operating shaft 32 supported below the casing 10 by the bearings 33 mounted upon the lower longitudinally extending beams 12. This shaft may be rotated by the usual pulley 34 and upon this shaft are mounted the spaced eccentrics 35 which are rigidly secured to the shaft, and are disposed at the opposite sides of the casing 10.

Upon each eccentric 35 is mounted a pair of grooved eccentric sheaves 36 and 37. Operative movement is imparted from the eccentric sheaves 36 and 37 to the casing 10 by cables 38 and 39. Each of these cables has one end anchored to the supporting frame by a bolt 40 provided with an adjustable nut 41 for varying the tension of the cable, and the opposite end of each of these cables is secured to a bracket 42 fastened to the side rail 18 of the casing 10. The cables 38 disposed at each side of the casing 10 extend from the anchoring means 40 about their respective grooved eccentric sheaves 37 and then upwardly about the idler sheaves 43 to the brackets 42. The idler sheaves 43 are rotatably supported at each side of the casing 10 by stub shafts 44. The cables 39 at each side of the casing 10 extend from their anchoring means 40 about the grooved eccentric sheaves 36 and then around the idler sheaves 45 supported by stub shafts 46 to their anchoring means 42. As the main shaft 32 is rotated, the eccentrics 35 rotate within the sheaves 36 and 37 and move the sheaves so that they alternately tension and slack off the cables 38 and 39, and this will serve to pull the casing 10 back and forth with a simple reciprocatory movement that will shake the materials downwardly thru the various screens 28.

It is desirable to provide means for preventing the materials passing downwardly thru the screens 28 from accumulating close to the opposite sides of the casing 10, as the air currents are not as strong close to the sides of the casing as they are near the center of the same. The screens 28 are therefore shown in Fig. 4 as being inclined upwardly at their opposite sides as at 47, as this inclination will serve to direct the materials away from the opposite sides of the casing 10. In Fig. 5 a different construction is shown from that of Fig. 4, for accomplishing the same end, and in Fig. 5, instead of bending the marginal edges of the screens 28, upwardly inclined strips of wood or other material 48 are provided which will direct the materials away from the side walls of the casing.

If it is not desirable to keep separate the materials discharged from the various hoppers 29, these hoppers may all empty into a common receptacle such as shown in Fig. 2, and to this end below the casing 10 is mounted a longitudinally extending pipe 49 which is shown as closed at its left-hand end, and the lower ends of the various hoppers 29 are shown as connected to necks 50 upon the pipe 49 by flexible tubes 51, and the materials within the pipe 49 are advanced lengthwise thereof by a rotating screw 52.

In the modification shown in Figs. 6 and 7 the hollow casing 52 has the suction pipe 53 rigidly secured to the casing to partake of the vibratory movement of the casing and it is connected to a fixed suction pipe 54 by the flexible tube 55.

The feed hopper 56 is shown as mounted upon the casing 52 a substantial distance from the right hand end of the casing. This arrangement is desirable in some cases since it causes the materials to slide along a relatively long closed trough 57 before they reach the fine screen 58, and this will promote stratification of the materials.

Within the casing 52 are mounted a series of screens one above the other as in the casing 10, but the screens in the modified construction of Figs. 6 and 7 are formed of apertured sections 59 separated by unapertured sections 60, this construction being desirable to promote stratification of the materials that settle upon the unapertured sections 60. In this construction it is desirable to impart a sufficient progressive movement to the materials that lodge on the unapertured sections 60 to cause them to slide along these sections. The casing 52 is therefore shown as supported at a longitudinal inclination by the frame 61, and is suspended from the frame 61 by straps 62 for back and forth movement.

The operating means for the casing 52 may consist of cables 63 at the opposite sides of the casing, and these cables have one end secured to the frame at 64 while the opposite end of each cable is secured to the casing at 65. Each cable passes around an idle sheave 66 and an eccentric sheave 67 as in Fig. 1, and the cables 63 serve to pull the casing 52 in a left hand direction while springs 68 may be provided to pull the casing in the opposite direction to promote travel of the materials upon the sections 60 in a right hand direction.

The right-hand end of the casing 52 is open as in Fig. 1 and air is drawn in thru this open end lengthwise of the casing between the various screens by the suction tube 53 so that the currents of air will pass thru the materials passing downwardly within the casing and will carry off the lighter particles as in Fig. 1. Inclined strips 69 similar to the strips 48 of Fig. 5 may be provided at each side of the casing 52 to prevent the materials from accumulating adjacent the walls of the casing.

The materials that pass downwardly thru the various screens and lodge on the floor of the casing 52 may be drawn off thru the discharge pipes 70.

The air currents preferably travel longitudinally of the casings 10 and 52 between the adjacent screens without passing upwardly or downwardly thru the screens an appreciable amount, and if desired the air entrance opening at the right-hand end of these casings may be constructed so that the currents of air traveling between the screens in the lower portion of a casing will be either stronger or weaker than the air currents traveling longitudinally of the casing in the upper part thereof.

What is claimed is:—

1. An air classifier for treating fine dust like materials, comprising in combination, a casing, means for introducting the materials to be treated into the upper part of the casing to pass downward therein, a multiplicity of screens mounted substantially horizontally within the screen one above the other and a fraction of an inch apart to form a large number of air chambers extending lengthwise of the casing, said screens having a mesh larger than the largest particles delivered into the casing for treatment that the materials may pass downward through the successive screens, and means for producing currents of air passing lengthwise of the casing between the screens to carry off the lighter particles.

2. An air classifier for treating fine dust like materials, comprising in combination, a casing, means for introducing the materials to be treated into the upper part of the casing to pass downward therein, a multiplicity of screens mounted within the casing one above the other in close proximity to each other and each of the screens having a mesh larger than the material delivered into the casing for treatment that the largest particles may pass downward through the successive screens, and means for producing currents of air passing lengthwise of the casing to carry off the lighter particles.

3. An air classifier for treating fine dust like materials, comprising in combination, a casing having an air entrance at one end, a series of screens extending longitudinally of the casing and mounted one above the other in close proximity to provide a multiplicity of air passages extending lengthwise of the casing and each of the screens having apertures that are large enough to permit all materials treated to pass thru the screens without clogging the apertures, means for delivering materials to be treated to the uppermost screen to pass downwardly thru the successive screens, and means for exhausting air from the opposite end of the casing to produce air currents traveling lengthwise of the casing between the spaced screens to carry off the lighter particles.

4. An air classifier, comprising in combination, a casing, means for delivering the materials to be treated into the upper part of the casing to pass downwardly within the casing, a series of screens mounted within the casing one above the other in close proximity to each other to retard the downward passage of the materials thru the casing and having apertures that are large enough to permit the largest materials being treated to pass thru the successive screens without lodging in the apertures, and means for producing currents of air passing lengthwise of the casing between the screens to carry off the lighter particles.

5. An air classifier for treating fine materials, comprising in combination, a casing mounted for vibratory movement in a horizontal direction, means for delivering the materials to be treated into the upper part of the casing to pass downwardly within the casing, a multiplicity of screens mounted substantially horizontally within the casing one above the other in close proximity to each other to retard the downward passage of the materials thru the casing, and the screens having a mesh large enough to permit the largest particles being treated to pass downward through the successive screens, means for vibrating the casing to promote passage of the materials thru the screens, and means for producing currents of air that pass lengthwise of the casing between the screens to carry off the lighter particles.

6. An air screen and classifier, comprising in combination, a casing, means for delivering the materials to be treated to the upper part of the casing near one end thereof to pass downwardly within the casing, a series of relatively long screens mounted in the casing one above the other in close proximity to each other to retard the downward passage of the materials thru the casing and having apertures that are large enough to permit the largest materials being treated to pass thru the successive screens without lodging in the apertures, and means for producing currents of air that pass lengthwise of the casing between the screens to classify the materials by carrying them different distances lengthwise of the screens.

7. An air classifier, comprising in combination, a casing, means for delivering the materials to be treated to the upper portion of the casing to pass downwardly within the casing, a multiplicity of screens mounted substantially horizontally within the casing one above the other to retard the downward passage of the materials thru the casing, means for producing currents of air passing lengthwise of the casing between the screens to carry off the lighter particles, and inclined surfaces at the opposite sides of the screens for directing the materials inwardly away from the side walls of the casing.

8. An air screen and classifier, comprising in combination, an elongated casing, means for delivering the materials to be treated to the upper part of the casing near one end thereof to pass downwardly within the casing, a multiplicity of screens extending longitudinally of the casing and supported one above the other in close proximity to each other to retard the downward passage of the materials thru the casing and each screen having apertures large enough to permit the largest particles being treated to pass therethrough, means for producing currents of air passing lengthwise of the casing between the screens to carry different grades of materials different distances along the screens to classify them, and discharge chutes provided along the bottom of the casing for removing the different grades of materials from the casing.

9. An air classifier, comprising in combination, a casing, means for delivering the materials to be treated to the upper part of the casing to pass downwardly within the casing, a screen at the upper part of the casing and having a mesh that is fine enough to prevent the abnormally large particles from passing thru the screen, a multiplicity of screens mounted one above the other within the casing to retard the downward passage of the material within the casing and all having a larger mesh than the first mentioned screen, and means for producing currents of air passing thru the casing between the multiplicity of screens to carry off the lighter particles.

10. An air classifier, comprising in combination, a casing, means for delivering the materials to be treated to the upper part of the casing to pass downwardly within the casing, a multiplicity of screens mounted within the casing one above the other to retard the downward passage of the materials thru the casing, means for producing currents of air passing lengthwise of the casing between the screens to carry off the lighter particles, and the screens being provided with apertured sections separated by unapertured sections.

11. An air classifier, comprising in combination, a casing, means for delivering the materials to be treated to the upper part of the casing to pass downwardly within the casing, a multiplicity of screens mounted within the casing one above the other to retard the downward passage of the materials thru the casing, means for producing currents of air passing lengthwise of the casing between the screens to carry off the lighter particles, and the screens being provided with apertured sections separated by unapertured sections that extend entirely across the casing to effect stratification of the materials that lodge on the unapertured sections.

In testimony whereof, I have signed my name to this specification.

ALBERT H. STEBBINS.